(12) United States Patent
Warnes et al.

(10) Patent No.: US 10,592,364 B2
(45) Date of Patent: Mar. 17, 2020

(54) HANDLING ERRORS DURING RUN TIME BACKUPS

(71) Applicant: HEWLETT PACKARD ENTERPRISE DEVELOPMENT LP, Houston, TX (US)

(72) Inventors: Lidia Warnes, Roseville, CA (US); Patrick M. Schoeller, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 96 days.

(21) Appl. No.: 15/578,557

(22) PCT Filed: Jun. 19, 2015

(86) PCT No.: PCT/US2015/036720
§ 371 (c)(1),
(2) Date: Nov. 30, 2017

(87) PCT Pub. No.: WO2016/204789
PCT Pub. Date: Dec. 22, 2016

(65) Prior Publication Data
US 2018/0157565 A1 Jun. 7, 2018

(51) Int. Cl.
*G06F 11/00* (2006.01)
*G06F 11/20* (2006.01)
(Continued)

(52) U.S. Cl.
CPC ...... *G06F 11/2094* (2013.01); *G06F 11/1441* (2013.01); *G06F 11/1456* (2013.01);
(Continued)

(58) Field of Classification Search
CPC ............ G06F 11/2094; G06F 11/1456; G06F 11/1458; G06F 11/1441; G06F 11/2015;
(Continued)

(56) References Cited

U.S. PATENT DOCUMENTS 7,062,704 B2 * 6/2006 Talagala .............. G06F 11/1076
711/114
7,830,732 B2 11/2010 Moshayedi et al.
(Continued)

FOREIGN PATENT DOCUMENTS

WO WO-2014120140 8/2014

OTHER PUBLICATIONS

International Search Report and Written Opinion received in PCT Application No. PCT/US2015/036720, dated Feb. 29, 2016, 9 pages.
(Continued)

*Primary Examiner* — Yair Leibovich
(74) *Attorney, Agent, or Firm* — Hewlett Packard Enterprise Patent Department

(57) ABSTRACT

Examples provide systems and a method for handling errors during run-time back up of volatile memory. The method includes initiating a backup of a volatile memory domain to a non-volatile memory domain. Memory registers are polled for completion of the backup. It is determined if the backup was successful. If not successful, an operating system (OS) is notified that the backup failed, and the backup is completed to an alternate media.

12 Claims, 6 Drawing Sheets

(51) Int. Cl.
*G06F 11/14* (2006.01)
*G06F 11/07* (2006.01)

(52) U.S. Cl.
CPC ...... *G06F 11/1458* (2013.01); *G06F 11/0766* (2013.01); *G06F 11/2015* (2013.01); *G06F 2201/805* (2013.01); *G06F 2201/82* (2013.01)

(58) Field of Classification Search
CPC .......... G06F 11/0766; G06F 2201/805; G06F 2201/82
USPC ........................................................ 714/6.3
See application file for complete search history.

(56) References Cited

U.S. PATENT DOCUMENTS

| | | | |
|---|---|---|---|
| 8,009,499 B2 | 8/2011 | Reuter et al. | |
| 8,412,680 B1 | 4/2013 | Gokhale et al. | |
| 8,578,110 B2 | 11/2013 | Fukazawa et al. | |
| 2002/0162075 A1* | 10/2002 | Talagala | G06F 11/1076 714/819 |
| 2004/0088508 A1 | 5/2004 | Ballard et al. | |
| 2006/0015698 A1 | 1/2006 | Kim et al. | |
| 2008/0155307 A1* | 6/2008 | French | G06F 11/2089 714/3 |
| 2008/0175065 A1* | 7/2008 | Choi | G11C 8/06 365/185.22 |
| 2011/0041004 A1 | 2/2011 | Miwa et al. | |
| 2013/0024603 A1* | 1/2013 | Steffey | G06F 8/654 711/103 |
| 2013/0212321 A1* | 8/2013 | Talagala | G06F 12/0246 711/103 |
| 2018/0074907 A1* | 3/2018 | Warnes | G06F 11/1441 |

OTHER PUBLICATIONS

Lynn, B. et al., Non-volatile Cache for Host-Based Raid Controllers, (Research Paper), Jan. 2011, 14 Pages.

* cited by examiner

300

HANDLING ERRORS DURING RUN TIME BACKUPS

BACKGROUND

A computing system may include a number of memory modules. These memory modules may serve as system memory or "primary memory" of the system, which may store information for running programs and the like. These memory modules may serve also, in some situations, serve as "secondary memory" or longer term storage, to store information of the system, even after power cycles. Some memory modules include volatile memory and non-volatile memory.

DESCRIPTION OF THE DRAWINGS

Certain examples are described in the following detailed description and in reference to the drawings, in which.

DETAILED DESCRIPTION

Figure 1:
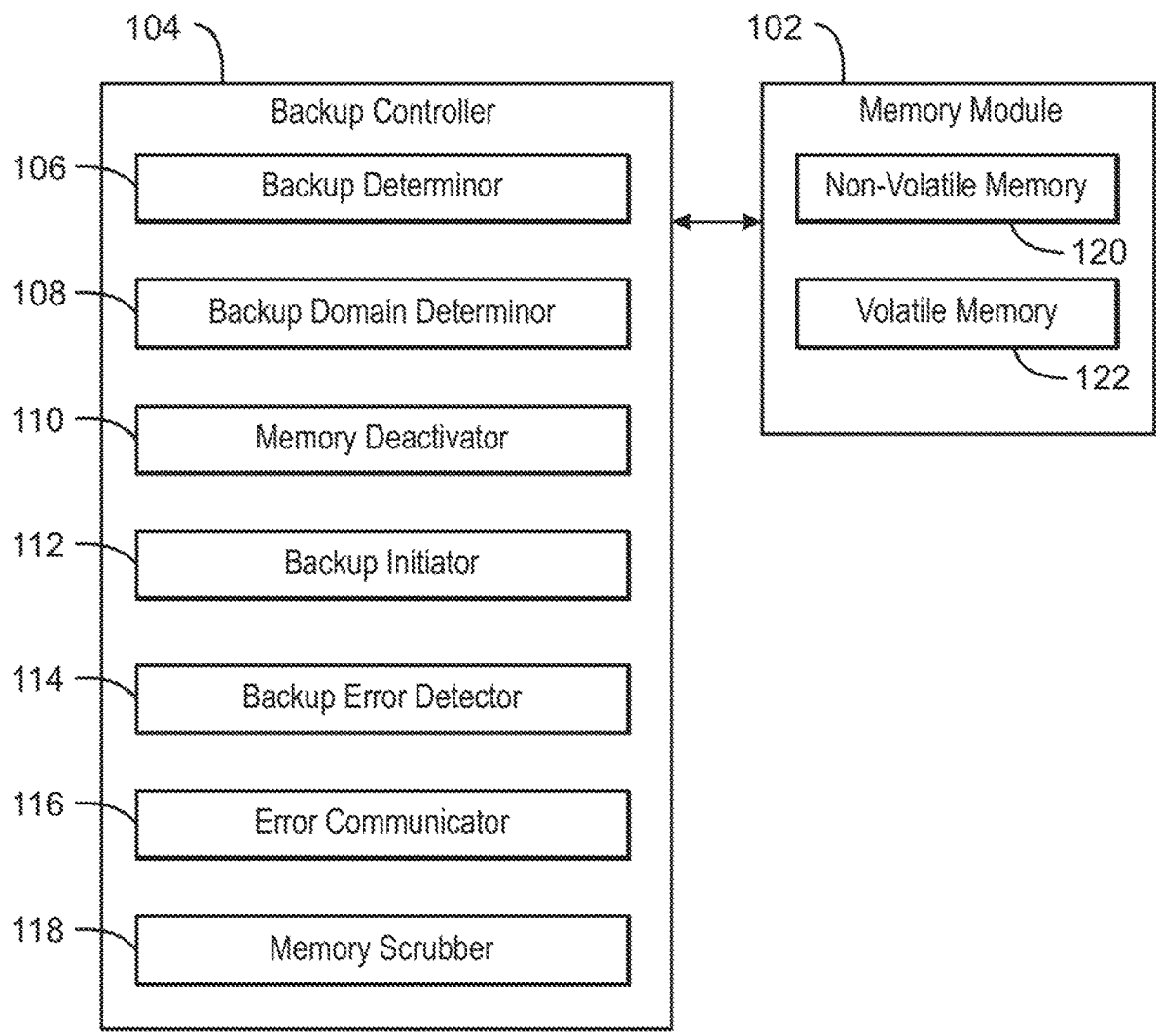
FIG. 1 is a block diagram of an example of a computing system for handling errors during runtime backup of volatile memory to non-volatile memory.

A computing system may include a number of memory modules. These memory modules may serve as system memory or "primary memory" of the system, which may store information for running programs and the like. These memory modules may also, in some situations, serve as "secondary memory" or longer term storage, to store info nation of the system, even after power cycles. Some memory modules include a volatile memory and a non-volatile memory. The volatile memory may be, for example, dynamic random access memory (DRAM), static random access memory (SRAM), or the like. The non-volatile memory may be, for example, flash memory, memristor memory, or the like.

For some systems that include memory modules having volatile memory and a non-volatile memory, during runtime of the system, the operating system may direct a processor to store data in the volatile memory. Then, when a power-loss event occurs, e.g., due to a system failure, data from the volatile memory may be copied to the non-volatile memory for backup and persistence purposes. The data that is copied to the non-volatile memory, may then be used to restore the system state upon reboot or power cycle of the system. In short, in such systems, the backup of data from volatile to non-volatile memory is performed when the system crashes, reboots, shuts down, etc., and not during runtime.

Such operation may present issues. For example, backup at the time of a power-loss even requires a backup-power source to power the data transfer, and such a backup-power source may become a single point of failure in the system. Additionally, because the data backup likely occurs after a failure, the data being transferred to the non-volatile memory may be corrupted, e.g., if the error was uncorrectable, and if the backup data is corrupted, the system may be unable to restore the system state from corrupted data. Therefore, such a system may be less reliable.

For some systems that include memory modules having volatile memory and a non-volatile memory, data from the volatile memory may be copied, e.g., backed up, to the non-volatile memory during runtime of the system. However, in these systems, when a backup is initiated, all the data in the volatile memories of the system is transferred to non-volatile memories. To accommodate this backup, the memory controller of the system is prevented from issuing any memory operations on the entire memory bus. In other words, the memory controller, during the backup, relinquishes control of all the memory modules of the system. Such a full backup can be time consuming. For example, backing up one full memory module could take up to two minutes.

According to the present disclosure, a backup controller in a system may determine that, during normal runtime of the system, a backup should occur in a memory module, for example, including volatile memory and non-volatile memory. Further, the backup controller may determine a backup domain of the volatile memory, where the backup domain may indicate a portion of the volatile memory, e.g., a range of memory addresses, which is to be backed up. The backup controller may deactivate a portion of or all of the volatile memory that includes the backup domain, where the deactivation includes preventing access by a memory controller to that portion during backup. The backup controller may then initiate the backup during normal runtime of the system. The backup controller may then initiate the backup by, for example, causing the memory module to enter a self-refresh mode or routine. Because the backup controller deactivates only a portion of the total memory of the system during backup, the rest of the memory, such as the rest of the memory module or memory in other memory modules of the system, may continue to be accessed and used as normal by the system during backup. After each backup, the backup controller enables the system to come back or transition back to a normal operating state in which all of the memory can be accessed.

The present disclosure may provide a more reliable backup method than examples described above where backup is performed at the time of a power-loss event. Because backups are performed during normal runtime of the system, and not during system failures, the backup power source is essentially eliminated as a single source of failure. Some backups may still be performed at the time of a power-loss event, but the amount of data that would need to be backed up is much less, and thus, the size and cost of the backup power source needed is significantly reduced. Additionally, because the data is backed up during runtime when the system is in a healthy state, the backed up data is likely not corrupted, and thus, the probability that the system could be restored from the backup data if need be is much higher. Additionally, compared to examples described above where full backups are performed at runtime, the partial backups offer significant time savings. Partial backups during runtime can be performed much more quickly than full backups. Furthermore, boot time may be significantly decreased because, as described above, a smaller backup power source may be used which takes less time to charge at system startup. Boot time is also reduced when the data that is being used to restore the system state is healthy, as is the case with the solutions of the present disclosure.

Although the techniques described above provide substantial advantages, when a backup operation occurs at run time the system needs to be prepared to handle memory error conditions. The present disclosure provides examples of systems and method for handling run time backup errors without bringing down the system in which the memory is installed. The method may prevent system crashes due run time backup errors in non-volatile memory. This may allow the operating system to move the information that it needs backed up to other media, such as other non-volatile memory, solid state drives, hard disk drives, and the like, and prevent data loss and data corruption. This increases the probability that the backup data is going to be correct and available upon system reboot.

FIG. 1 is a block diagram of an example of a computing system 100 for handling errors during runtime backup of volatile memory to non-volatile memory. The computing system 100 may be any computing system or computing device capable of using memory modules that include both volatile memory and non-volatile memory. The computing system 100 may include a memory module 102 and a backup controller 104. The backup controller 104 may include a backup determinor 106, a backup domain determinor 108, a memory deactivator 110, a backup initiator 112, a backup error detector 114, an error communicator 116, and a memory scrubber 118.

The memory module 102 may include a non-volatile memory 120 and a volatile memory 122. The backup controller 104 may determine, e.g., via backup determinor 106, that a backup should occur in the memory module 102. The backup controller 104 may determine, e.g., via backup domain determinor 108, a backup domain of the volatile memory 122. Additional description of backup domains is provided herein. The backup controller 104 may cause, e.g., via memory deactivator 110, a deactivation domain of volatile memory 122 to be deactivated, where the deactivation domain includes the backup domain. The backup controller 104 may cause, e.g., via backup initiator 112, the backup to initiate during normal runtime of the system, for example, outside of system failure. The backup process includes data in the backup domain of the volatile memory being saved to the non-volatile memory. The backup controller 104 may detect, e.g., via backup error detector 114 that the backup of the backup domain from the volatile memory 122 has had an error, such as a failure of the non-volatile memory. The backup controller 104 can communicate the error to an operating system, a management controller, or both, e.g., via an error communicator 116. The backup controller 104 may also scrub the non-volatile memory 120, either periodically or after a backup, e.g., via a memory scrubber 118. As used herein, scrubbing a memory is a process in which a memory cell is read and compared to one or more parity bits to identify errors.

Figure 2:
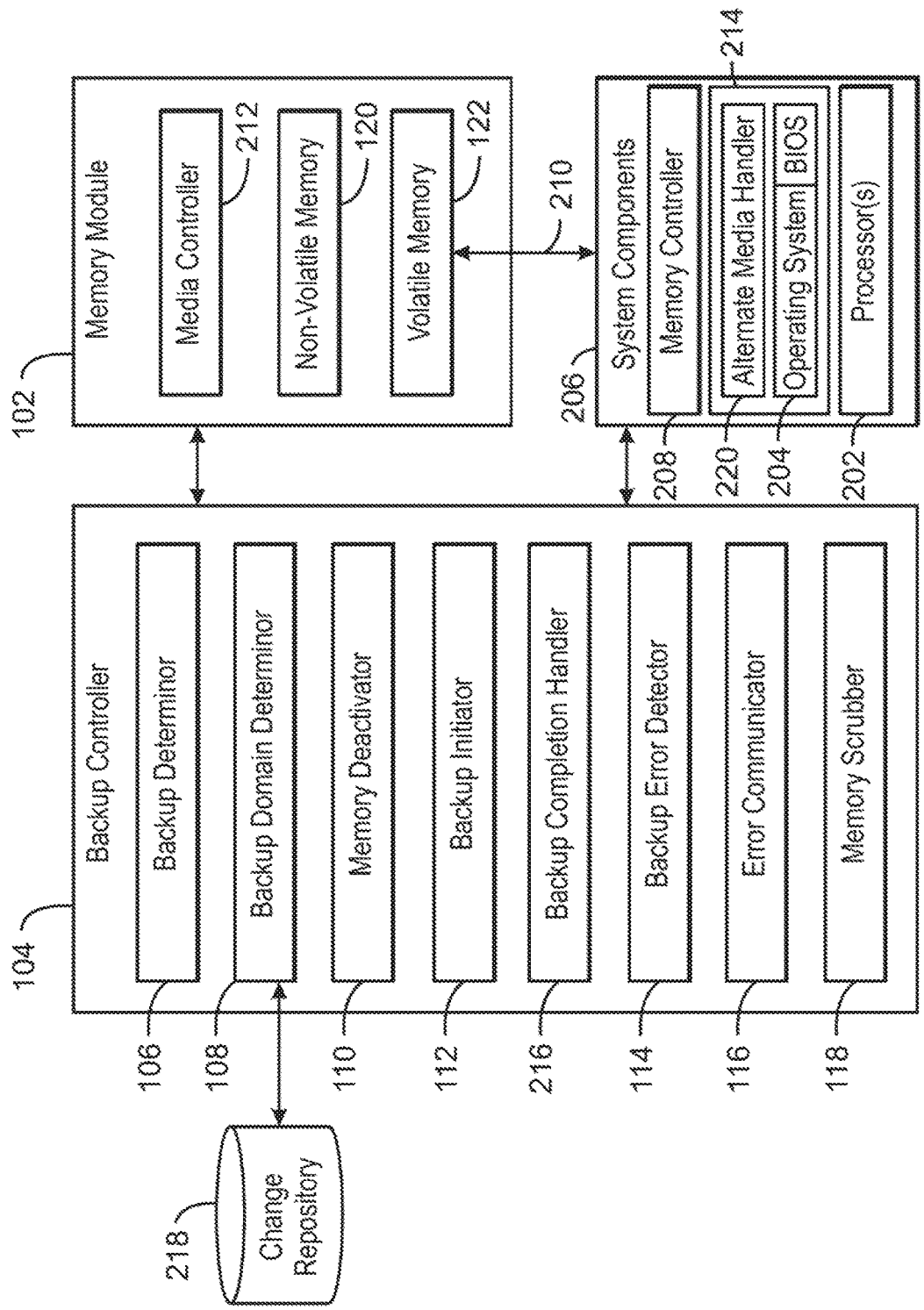
FIG. 2 is a block diagram of an example of a computing system for handling errors during runtime backup of volatile memory to non-volatile memory.

FIG. 2 is a block diagram of an example of a computing system for handling errors during runtime backup of volatile memory to non-volatile memory. Like numbered items are as described with respect to FIG. 1. The computing system 200 may be any computing system or computing device capable of using memory modules that include both volatile memory and non-volatile memory. Further, the computing system 200 is not limited to systems including memory modules that have both volatile and non-volatile memory, but may be used in systems that have only volatile memory, e.g., DRAM. In these systems, the partial backups of the memory may be performed to other non-volatile media, such as SSDs and HDDs.

The computing system 200 may include a memory module 102 and a backup controller 104. In operation, during runtime of the computing system 200, data from the volatile memory of the memory module 102 may be copied to the non-volatile memory of the memory module 102. The backup controller 104 may coordinate when such backups occur, which data should be backed up, and various other aspects of backups. The computing system 200 may be similar to the computing system 100 of FIG. 1 in many respects, and components of system 200 as described herein may provide convey further details to like-numbered components of system 100.

The memory module 102 may be any type of memory module, for example, a dual inline memory module (DIMM). The memory module 102 may be accessed by a processor 202, operating system 204, or other components 206 of system 200 to access memory in the memory module. Such accesses may be performed via a memory controller 208 and memory bus 210 of system 200. For example, memory controller 208 may interface directly with volatile memory 122 via memory bus 210. Access of memory module 102 via memory controller 208 and memory bus 210 may be considered the regular manner of accessing the memory module, to write data to and read data from the memory module during the usual runtime operation of system 200. The memory controller 208 may also provide access to additional memory modules of system 200.

The memory module 102 may include a volatile memory 122, which may be, for example, dynamic random access memory (DRAM), static random access memory (SRAM), or the like. The memory module 102 may include a non-volatile memory 120, which may be, for example, flash memory, memristor memory, or the like. The memory module 102 may include a media controller 212 that may communicate with non-volatile memory 120 and may communicate with volatile memory 122. The memory module 102 may also be in communication with backup controller 104, and in this respect, backup controller 104 may, via the media controller 212, perform operations on non-volatile memory 120 or volatile memory 122 without communicating through the regular manner, e.g., through the memory controller 208 and memory bus 210. It can be noted that the backup controller 104 may be a part of a management control system, for example, having access to a management control bus.

The memory module 102 may be placed in a self-refresh mode at various times. The term self-refresh traditionally referred to a routine where a volatile memory refreshed itself to avoid data loss. Volatile memories may include capacitors to store data, and those capacitors must have their charge replenished from time to time. The term self-refresh has taken on additional meanings as memory modules have evolved. A self-refresh routine may include, for example, flushing Input/Output (IO) buffers. A self-refresh routine for a memory module 102 may include copying data from a volatile memory 122 to a non-volatile memory 120. As used herein, the term self-refresh primarily refers to this copying of data, and may refer to copying all data in the volatile components of the memory module or part of the data in volatile components, as is described in more detail herein.

The memory module 102 may be placed in a self-refresh mode in various manners. For example, the memory controller 208 may cause the memory module 102 to enter a self-refresh mode. In these examples, the backup controller 104 may send asynchronous DRAM refresh (ADR) commands to the memory controller 208, and the memory controller 208 may receive and interpret these ADA commands. The memory controller 208 may then signal to the memory module 102, e.g., over the memory bus 210, that the memory controller 208 should enter a self-refresh mode. At this point, the media controller 212 may take over to perform a backup of data from volatile memory 122 to non-volatile memory 120. The ADR commands may also convey desired parameters for the self-refresh, for example, which data should be copied from the volatile memory to the non-volatile memory.

In another example, memory module 102 may be placed in a self-refresh mode by backup controller 104 communicating directly with media controller 212. For example, the backup controller 104 may send commands, such as direct media commands, to the media controller 212. The media controller 212 may interpret the direct media commands and, in response, place the memory module 102 in self-refresh mode. The media controller 212 may then take over to cause part or all of the data from the volatile memory 122 to be copied and hacked up to the non-volatile memory 120. The direct media commands may also convey desired contours of the self-refresh, for example, which data should be copied from the volatile memory to the non-volatile memory.

The backup controller 104 may coordinate when backup occur in the memory module 102 from the volatile memory 122 to the non-volatile memory 120, as well as when backups occur in other memory modules of system 200. The backup controller 104 may also determine which data should be backed up, and various other aspects of backups. In some examples, the backup controller 104 may be electronic circuitry, i.e., hardware, which implements the functionality of the backup controller. The backup controller 104 may also include software, firmware, or both. For example, backup controller 104 may be implemented partially or fully in system firmware, e.g., the BIOS or Basic Input/Output System, or in the chipset of the computing system 200. As another example, the backup controller 104 may be implemented partially or fully in a dedicated integrated circuit such as an application-specific integrated circuit (ASIC), or in a dedicated field-programmable gate array (FPGA). In some examples, the backup controller 104 may be implemented as instructions, e.g., stored on a machine-readable storage medium 214 of the computing system 200, which, when executed by a processor 202 of the computing system 200, perform the functionality of the backup controller. For example, backup controller may be implemented partially or fully in an operating system 204 of the computing system 200 that runs on a processor 202 of system 200.

The backup controller 104 may include a backup determinor 106, a backup domain determinor 108, a memory deactivator 110, a backup initiator 112, a backup error detector 114, an error communicator 116, a memory scrubber 118 and a backup completion handler 216. Each of these components may be implemented as hardware or some combination of hardware and software/firmware as described above regarding backup controller 104 generally.

The backup determinor 106 may determine when a backup of volatile data in memory module 102, and perhaps other memory modules of system 200, should occur. For example, the backup determinor 106 may detect a signal from an operating system of system 200 that indicates that a backup should occur. In this example, the operating system 204 may be external to the backup controller 104 and backup determinor 106 may be responsive to the operating system 204 determination of when a backup should occur. As another example, the backup determinor 106 may be part of the operating system 204, and thus, the determination of when the backup should occur may originate in the backup determiner 106. Regardless of where the determination of when the backup should occur originates, the timing of backups is determined. Backups may be scheduled, for example, during idle computing periods in the computing system 200, e.g., when the processing of other jobs in the system is at a minimal level. As another example, backups may be scheduled periodically, e.g., at regular time intervals. In both of the above examples, the backup determiner 106 schedules backups during normal runtime of system 200, pre-emptively before a power-loss or failure event occurs. However, it should be understood that the computing system 200 may initiate additional backups when a power-loss event occurs. Once the backup determinor 106 determines that a backup should occur, it may signal this to the backup domain determinor 108.

The backup domain determinor 108 may determine a part of volatile memory 122 in the computing system 200 that should be backed up. In some, examples, the backup domain determinor 108 may determine that all of the volatile memory 122, and in other memory modules, in the computing system 200 should be backed up. This would be a full backup. However, the backup domain determinor 108 may determine that a partial backup should occur. A partial backup, for example, may be a backup of the volatile data in just one memory module 102, or it may be a backup of just part of the volatile data in a particular memory module 102. The term "backup domain" may be used herein to refer to the portion of volatile memory 122, e.g., within one or multiple memory modules of system 200, that is to be backed up during any particular backup. A backup domain may be defined by a range of memory addresses, for example. A range of memory addresses cow identify a particular memory module 102 and could identify, within that memory module, a particular portion of volatile memory 122. Further examples described below, for easy of description, may refer to partial backups within a particular memory module 102. However, it should be understood that the present disclosure also contemplates full backups and also partial backups that may include memory portions that span multiple memory modules 102 of system 200.

The backup domain determinor 108 may determine the backup domain in various ways. For example, the backup domain determinor 108 may segment the total system memory into defined chunks, and when a backup is started, one or more of those chunks may be translated to determine the backup domain in the volatile memory 122, and this may get backed up during a particular backup. Then, on a subsequent backup, one or more additional chunks could get backed up, and so on.

In other examples, the backup domain determinor 108 may determine the backup domain by determining which memory or data is most in need of backup. For example, memory locations with data that has been changed since a previous backup may be determined and translated to calculate the backup domain for a current backup. The computing system 200 may include a change repository 218 that may store information about memory locations that have data that has been modified since a last backup. In this respect, backup of memory modules with volatile and non-volatile components may be performed in an incremental manner. The change repository 218 may be maintained, e.g., updated and written to as various updates take place, by the backup domain determiner 108 in the examples where backup controller 104 is not part of the operating system, or by the operating system 204 of the computing system 200. Change repository 218 may be a data store that stores digital information and may include or be in communication with a physical storage mechanism (e.g., hard drive, solid state drive, flash memory, other non-volatile memory 120, or the like) capable of storing information including, for example, a digital database, a file capable of storing text, settings or the like.

The following is one particular example of how the change repository 218 may be used by the backup domain determinor 108. To start, the change repository 218 may be up to date regarding memory addresses that have been modified since a last backup. When the backup domain determinor 108 receives, e.g., from the backup determiner 106, an indication that a backup is to begin, the backup domain determiner 108 may access the change repository 218 and determine which addresses need to be backed up. In some examples, if the address range that needs to be backed up is larger than a defined maximum size, e.g., a backup size threshold, the backup domain determiner 108 may select just a portion of the address range to be backed up during the current backup and the rest may be backed up with subsequent backups. In this situation, the change repository 8 may then continue to store, for the next backup, address ranges that were ready to be backed up during the current backup but were not selected because they exceeded the backup size threshold. The backup domain determinor 108 may, in some examples, determine a smallest addressable portion of the volatile memory 122 that includes the memory portion that is to be backed up. This smallest addressable portion may be the smallest address range that the media controller 212 can access in the volatile memory 122 and cause to be copied to the non-volatile memory 120, where the smallest addressable portion still includes the memory portion that is to be backed up. Once an appropriate address range is selected for backup, the backup domain determiner 108 may translate the physical addresses to logical addresses appropriate for addressing the memory in the memory module 102. This logical address range may be the backup domain. The backup domain determinor 108 may generate an ADR command, in the case of communication with memory controller 208, or a direct media command, in the case of communication with the media controller 212, that is designed to cause a self-refresh in the memory module. The ADR command or direct media command may be further designed to cause only the selected addresses, e.g., the backup domain, to be backed up in the memory module. Such an ADR command or direct media command may be an enhanced ADR command or direct media command that allows for indication of logical addresses to be backed up. In some examples, the media controller 212 in the memory module 102 may be capable of interpreting enhanced direct media commands. In some examples, the memory controller 208 may be capable of interpreting enhanced ADR commands.

The memory deactivator 110 may prevent access to all or part of the memory module 102 of the computing system 200 during backups. The memory deactivator 110 may, for example, disable part or all of the communication between the memory controller 208 and the memory nodule 102. Specifically, the memory deactivator 110 may communicate with memory controller 208 to prevent the memory controller 208 from writing to or reading from a particular memory address range in the memory module 102. The particular memory address range that is prevented from access by memory controller 208 during a particular backup may be referred to as the deactivation domain. The deactivation domain, in some examples, may be the entire volatile memory 122 of memory module 102. In these examples, memory controller 208 may still access other memory modules of the computing system 200 while access to the deactivation domain is prevented. In other examples, the deactivation domain may be part of volatile memory 122, e.g., a particular address range. In these examples, the memory controller 208 may still access other parts of the volatile memory 122 while access to the deactivation domain is prevented. In short, the memory deactivator 110 may prevent access by the memory controller 203 to the deactivation domain during a backup, and may again allow access when it is determined, e.g., via the backup completion handler 216, that the backup is complete or has failed. The memory deactivator 110 may, to determine the deactivation domain, determine a smallest addressable portion of the volatile memory 122 that includes the backup domain. This smallest addressable portion may be the smallest address range that the memory controller 208 can access in the volatile memory 122 and disable, e.g., to prevent access.

In order to ensure that the deactivation domain is not accessed during a backup, the memory deactivator 110 may also communicate with the operating system 204 of the computing system 200 such that the operating system 204 is informed that the deactivation domain should not be accessed. In some examples where backup controller 104 is part of the operating system 204, the operating system 204 may inherently be informed in this manner. Additionally, in order to ensure that the deactivation domain is not accessed during a backup, the memory deactivator 110 may prevent any ancillary routines from running that may cause the memory controller 208 to access the volatile memory 122, such as the memory scrubber 118 or other error correction routines or other ECC routines that automatically survey memory, checking for errant bits.

The backup initiator 112 may initiate a backup, for example, once the backup domain is determined and once the appropriate memory is deactivated. To initiate the backup, the backup initiator 112 may, in some examples, send a request such as an ADR command, to the memory controller 208 to cause memory module 102 to enter a self-refresh mode. In other examples, to initiate the backup, backup initiator 112 may send a request, e.g., a direct media command, to the media controller 212 to initiate a self-refresh of the memory module 102. The request may include details of the backup, for example, the backup domain. Once the self-refresh is initiated, the media controller 212 may coordinate backup of the backup domain from the volatile memory 122 to the non-volatile memory 120. In one particular example, and as described above, during a single backup, the backup domain may include memory addresses that include data that has been modified since a last backup. Once the backup is complete, and assuming all changed data is backed up to the non-volatile memory 120, the computing system 200 may be able to cycle the power in a reliable manner, and the system may be able to reboot and restore the post-backup state using data that was backed up in the non-volatile memory 120.

The backup completion handler 216 may detect when backups have completed or when they likely have failed, for example, using the backup error detector 114. When a backup completes or fails, the backup completion handler 216 may ensure that the computing system 200 is transitioned back to a normal operating state, e.g., where all memory can be accessed. In some examples, the backup completion handler 216 may maintain a completion timer.

The timer may be reset/restarted when a backup is initiated. After a backup is initiated, the backup completion handler 21 may monitor for an indication that the backup is complete.

To perform this monitoring, the backup completion handler 216 may signal the backup error detector 114 to listen for a signal from media controller 212 that the backup is complete. Alternatively, the backup error detector 114 may poll registers of the media controller 212 to determine whether a backup has finished, where the registers store backup progress information. If the timer runs out or passes a defined threshold before the backup error detector 114 receives an indication that the backup is complete, it may be determined that the backup likely failed. If the backup has failed, the backup error detector 114 may determine the reason for the failure.

The backup completion handler 216 may perform various tasks when a backup completes successfully. For example, the backup completion handler 216 may ensure that the memory module 102 is brought out of self-refresh mode. In some examples, media controller 212 may handle this task automatically, and may notify backup the backup completion handler 216 when it is complete. The backup completion handler 216 may notify the operating system of system 200 that a backup completed successfully, and that memory module 102 is ready for normal use. The backup completion handler 216 may likewise notify the memory controller 208 and may, e.g., with the assistance of memory deactivator 110, allow memory controller to once again access the deactivation domain in the memory of the memory module 102.

The backup completion handler 216 may perform similar tasks to those described above when a backup is determined to have failed by the backup error detector 114. For example, the memory module 102 may be brought out of self-refresh and the memory controller 208 may again access the deactivation domain in the memory module 102, until the next backup attempt. The backup completion handler 216 may perform additional tasks when a backup is determined to have failed, such as having an error communicator 116 inform the operating system 204 that the failure occurred. Further, the backup completion handler 216 may coordinate with e operating system 204 to have an alternate media handler 220 to back up the data in the volatile memory 122 to a different non-volatile storage, such as a hard drive or solid state drive, in some examples, the backup completion handler 216 may use the error communicator 116 to inform a management controller of the failure. The activities described herein, such as coordinating an alternate backup, may then be performed by the management controller.

Figure 3:
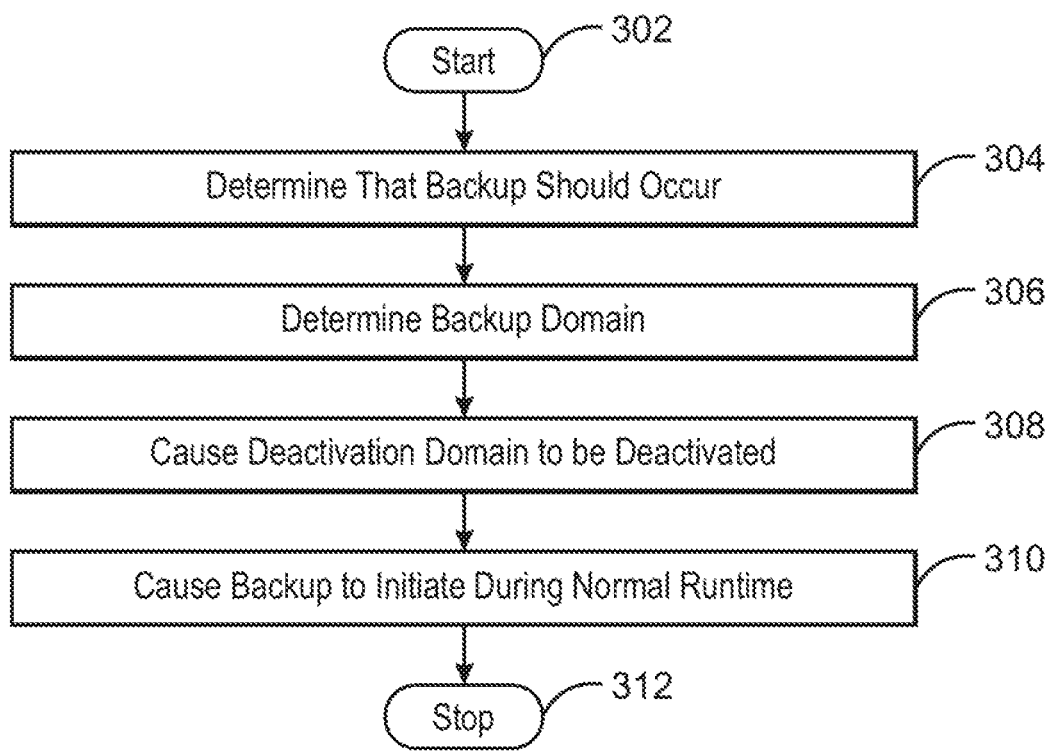
FIG. 3 is a flowchart of an example method for partial backup during runtime for memory modules with volatile memory and non-volatile memory.

FIG. 3 is a flowchart of an example method for partial backup during runtime for memory modules with volatile memory and non-volatile memory. The method 300 may be described as being executed or performed by a system, for example, the computing system 100 of FIG. 1 or the computing system 200 of FIG. 2. Other suitable systems or computing devices may be used as well. The method 300 may be implemented in the form of executable instructions stored on a machine-readable storage medium of the system and executed by a processor of the system. Alternatively or in addition, the method 300 may be implemented in the form of hardware, i.e., electronic circuitry. In alternate examples of the present disclosure, one or more blocks of the method 300 may be executed substantially concurrently or in a different order than shown in FIG. 3. In alternate examples of the present disclosure, the method 300 may include more or less blocks than are shown in FIG. 3. In some examples, one or more of the blocks of the method 300 may, at certain times, be ongoing and/or may repeat.

The method 300 may start at block 302 and continue to block 304, where the system may determine that a backup should occur in a memory module of the system having a volatile memory and a non-volatile memory. At block 306, they system may determine a backup domain of the volatile memory. The backup domain may be defined by a range of memory addresses within the volatile memory module. At block 308, the system may cause a deactivation domain of the volatile memory to be deactivated, where the deactivation domain includes the backup domain. At block 310, the system may cause the backup to initiate during normal runtime of the system. The backup routine includes data in the backup domain of the volatile memory being saved to the non-volatile memory. Method 300 may eventually continue to block 312, where method 300 may stop.

Figure 4:
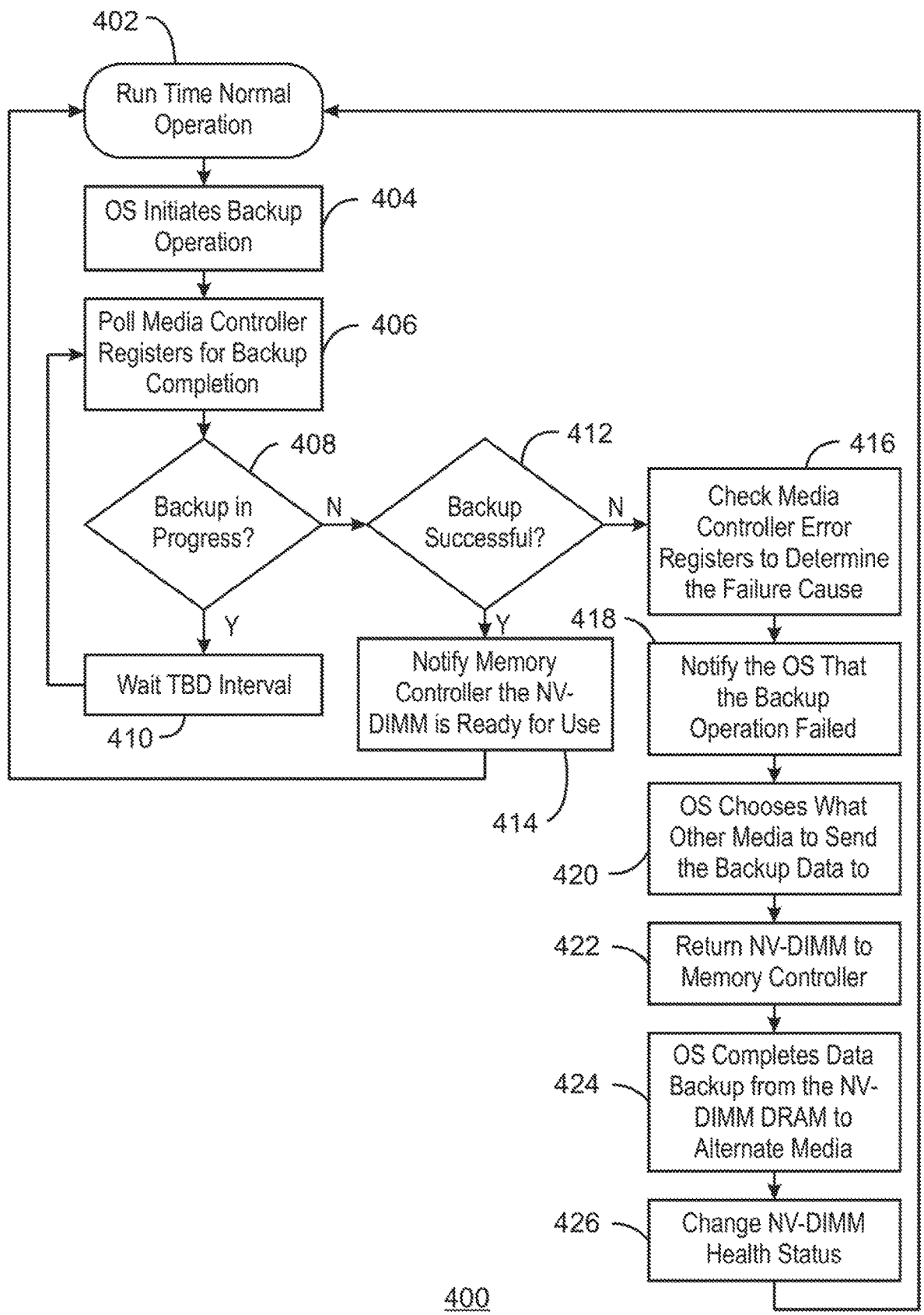
FIG. 4 is a flowchart of an example method for handling errors during a backup of contents of a volatile memory to a non-volatile memory.

FIG. 4 is a flowchart of an example method for handling errors during a backup of contents of a volatile memory to a non-volatile memory. The method 400 may be described as being executed or performed by a system, for example, the computing system 100 of FIG. 1 or the computing system 200 of FIG. 2. Other suitable systems or computing devices may be used as well. The method 400 may be implemented in the form of executable instructions stored on a machine-readable storage medium of the system and executed by a processor of the system. Alternatively or in addition, the method 400 may be implemented in the form of hardware, i.e., electronic circuitry. In alternate examples of the present disclosure, one or more blocks of the method 400 may be executed substantially concurrently or a different order than shown in FIG. 4. In alternate examples of the present disclosure, the method 400 may include more or less blocks than are shown in FIG. 4. In some examples, one or more of the blocks of the method 300 may, at certain times, be ongoing and/or may repeat.

The method 400 begins at block 402, with the system in a normal run time operation. At block 404, the operating system initiates the backup, for example, as described with respect to FIG. 2. While the backup is in progress, at block 406 registers, for example, in a media controller, are polled to determine if the backup is completed. At block 408, if the backup is still in progress, process flow proceeds to block 410, at which the process flow pauses for a selected interval, before returning to block 406 to poll the registers.

If the backup is no longer in progress at block 408, process flow proceeds to block 412 to determine whether the backup was successful. If the backup was successful, process flow proceeds to block 414, at which the memory controller is notified that the memory, such as an NV-DIMM, is ready for use.

If it is determined at block 412 that the backup was not successful, process flow proceeds to block 416, at which the reasons for the failure may be determined, for example, by checking the registers of the media controller. At block 418, the operating system may be informed of the failure of the backup operation. At block 420, the operating system may choose another media target for the backup. The memory is then returned to the control of the operating system, e.g., via the memory controller, at block 422. At block 424, the operating system completes the backup of the data from the volatile RAM, for example, in an NV-DIMM in which the nonvolatile memory has failed, to the alternate media. At block 426, the health status of the memory is changes to reflect the failure of the non-volatile memory. This may allow the operating system to select other volatile DIMMs for use, until the failed memory is replaced. After block 426, process flow returns to block 402 to resume normal operations.

Figure 5:
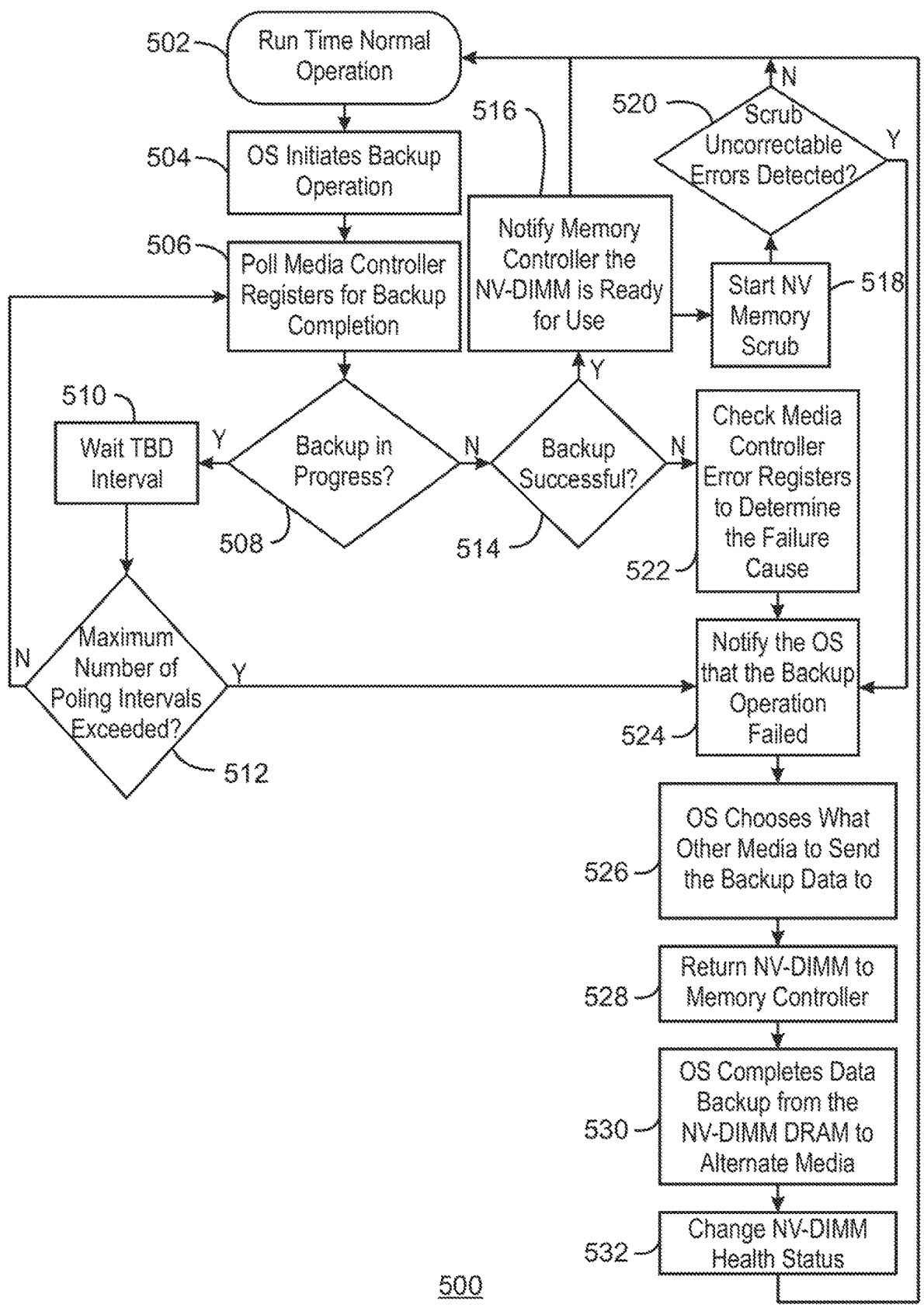
FIG. 5 is a flowchart of another example method for handling errors during a backup of contents of a volatile memory to a non-volatile memory.

FIG. 5 is a flowchart of another example method for handling errors during a backup of contents of a volatile memory to a non-volatile memory. The method 500 may be described as being executed or performed by a system, for example, the computing system 100 of FIG. 1 or the computing system 200 of FIG. 2, Other suitable systems or computing devices may be used as well. The method 500 may be implemented in the form of executable instructions stored on a machine-readable storage medium of the system and executed by a processor of the system. Alternatively or in addition, the method 500 may be implemented in the form of hardware, i.e., electronic circuitry. In alternate examples of the present disclosure, one or more blocks of the method 500 may be executed substantially concurrently or in a different order than shown in FIG. 5. In alternate examples of the present disclosure, the method 500 may include more or less blocks than are shown in FIG. 5. In some examples, one or more of the blocks of the method 500 may, at certain times, be ongoing and/or may repeat.

The method 500 of FIG. 5 is similar to the method of FIG. 4, with the addition of a few functions to further protect from failures. The method 500 begins at block 502, with the system in a normal run time operation. At block 504, the operating system initiates the backup, for example, as described with respect to FIG. 2. While the backup is in progress, at block 506 registers, for example, in a media controller, are polled to determine if the backup is completed. At block 508, if the backup is stilt in progress, process flow proceeds to block 510, at which the process flow pauses for a selected interval, before checking if a maximum number of polling intervals have been exceeded. If not, control is returned to block 506 to poll the registers.

If the backup is no longer in progress at block 508, process flow proceeds to block 514 to determine whether the backup was successful. If the backup was successful, process flow proceeds to block 516, at which the memory controller is notified that the memory, such as an NV-DIMM, is ready for use. A parallel process is also started with a memory scrub at block 518. If, at block 520, the memory scrub detected no uncorrectable errors, the scrub process also enters normal operation at block 502.

If it is determined at block 514 that the backup was not successful, process flow proceeds to block 522, at which the reasons for the failure may be determined, for example, by checking the registers of the media controller.

Once the registers have been polled to determine the cause of the failure at block 522, if the maximum number of polling intervals are exceeded at block 512, or if the memory scrub detects uncorrectable errors at block 520, process flow proceeds to block 524. At block 524, the operating system may be informed of the failure of a previously completed backup operation. At block 526, the operating system may choose another media target for the backup. The memory is then returned to the control of the operating system, e.g., via the memory controller, at block 528. At block 530, the operating system completes the backup of the data from the volatile RAM, for example, in an NV-DIMM in which the nonvolatile memory has failed, to the alternate media. At block 532, the health status of the memory is changes to reflect the failure of the non-volatile memory. This may allow the operating system to select other volatile DIMMs for use, until the failed memory is replaced. After block 532, process flow returns to block 502 to resume normal operations.

In either the method 400 of FIG. 4, or the method 500 of FIG. 5, the actions of the operating system may be implemented by a management controller. In this example, the backup to alternate media may be performed by the management controller over the normal network or over the management network. The operating system is still informed, so that a user may be alerted to the failure and the operating system may move data away from the failed media device.

Figure 6:
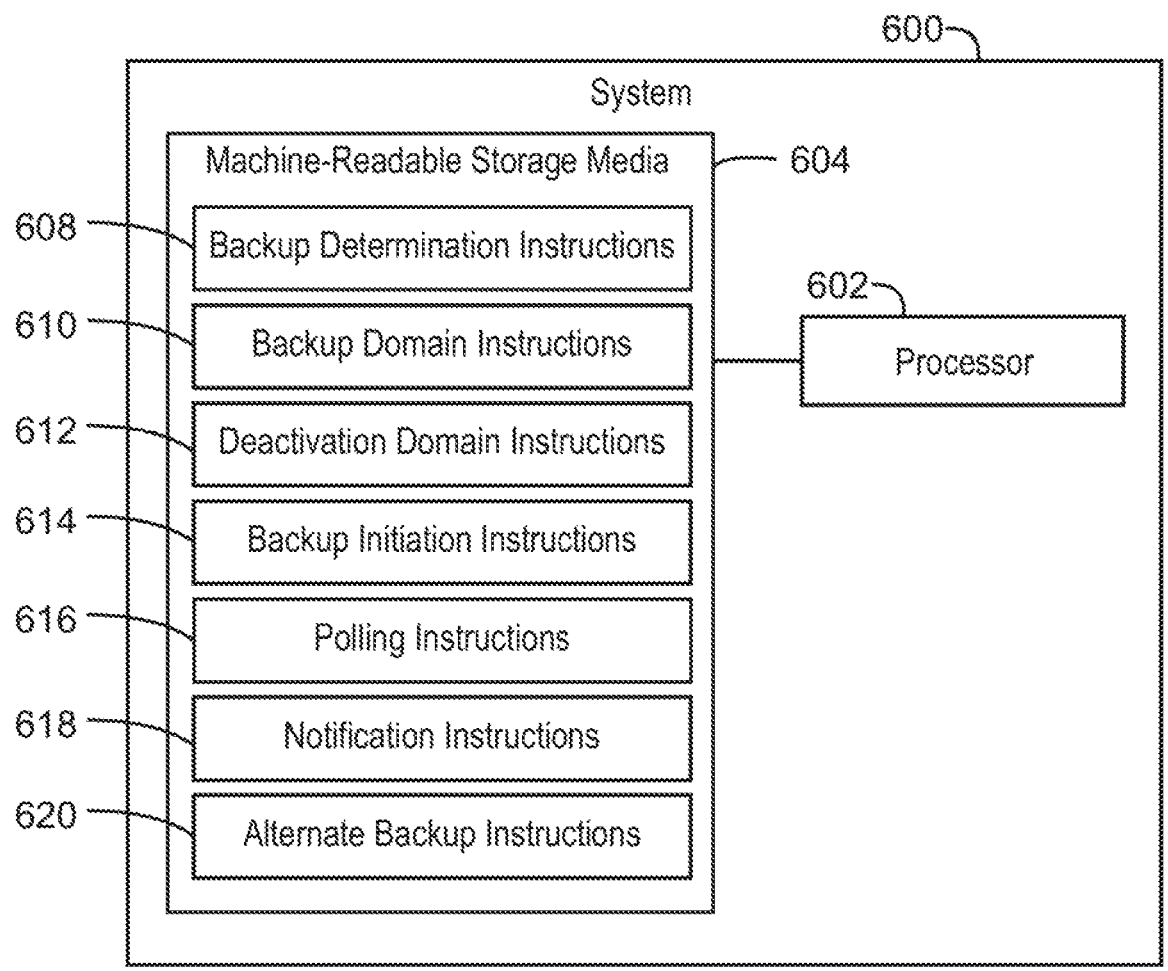
FIG. 6 is a block diagram of an example system for partial backup during runtime for memory modules with volatile memory and non-volatile memory.

FIG. 6 is a block diagram of an example system for partial backup during runtime for memory modules with volatile memory and non-volatile memory. The system 600 may be similar to the computing system 100 of FIG. 1 or the computing system 200 of FIG. 2, for example. In the example of FIG. 6, system 600 includes a processor 602 and a machine-readable storage medium 604. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

The processor 602 may be one or more central processing units (CPUs), microprocessors, and/or other hardware devices suitable for retrieval and execution of instructions stored in machine-readable storage medium 604. In the particular example shown in FIG. 6, the processor 602 may fetch, decode, and execute instructions 608, 610, 612, 614, 616, 618, and 620 to perform error handing to a partial backup of a volatile memory to a non-volatile memory, for example, as described with respect to FIGS. 1-5. As an alternative or in addition to retrieving and executing instructions, the processor 602 may include one or more electronic circuits comprising a number of electronic components for performing the functionality of one or more of the instructions in the machine-readable storage medium 604. With respect to the executable instruction representations (e.g., boxes) described and shown herein, it should be understood that part or all of the executable instructions and/or electronic circuits included within one box may, in alternate examples, be included in a different box shown in the figures or in a different box not shown.

The machine-readable storage medium 604 may be any electronic, magnetic, optical, or other physical storage device that stores executable instructions. Thus, machine-readable storage medium 604 may be, for example, Random Access Memory (RAM), an Electrically-Erasable Programmable Read-Only Memory (EEPROM), a storage drive, an optical disc, and the like. The machine-readable storage medium 604 may be disposed within system 600, as shown in FIG. 6. In this situation, the executable instructions may be "installed" on the system 600. Alternatively, the machine-readable storage medium 604 may be a portable, external or remote storage medium, for example, that allows system 600 to download the instructions from the portable/external/remote storage medium. In this situation, the executable instructions may be part of an "installation package". As described herein, the machine-readable storage medium 604 may be encoded with executable instructions for error handling during partial backup during runtime for memory modules with volatile memory and non-volatile memory.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents failing within the scope of the present techniques.

What is claimed is:

1. A system for handling errors during runtime memory backup, the system comprising:
a memory module having a volatile memory and a non-volatile memory; and a backup controller to:
determine that a backup should occur in the memory module;
determine a backup domain of the volatile memory;
deactivate a domain of the volatile memory, where the domain includes the backup domain; and
initiate the backup to non-volatile memory during normal runtime of the system, the backup including data in the backup domain of the volatile memory being saved to the non-volatile memory;
cause a timer to start when the backup is initiated;
listen for an indication that the backup completed successfully; and
detect a failure of the backup when the timer expires without the backup controller receiving the indication that the backup completed successfully, and, if a failure is detected, cause the data in the backup domain of the volatile memory to be saved in a different non-volatile storage external to the memory module.

2. The system of claim 1, the backup controller to notify an operating system of the failure and the operating system to backup the data to the different non-volatile storage external to the memory module.

3. The system of claim 1, comprising a management controller, the backup controller to notify the management controller of the failure.

4. The system of claim 3, the management controller to backup the data to the different non-volatile storage external to the memory module.

5. The system of claim 4, comprising a management network, the management controller to transfer the data to the different non-volatile storage external to the memory module over the management network.

6. A method for handling errors during run-time back up of volatile memory, comprising:
determining that a backup should occur in a memory module having a volatile memory and a non-volatile memory;
determining a backup domain of the volatile memory, the backup domain being defined by a range of memory addresses within the volatile memory;
deactivating a deactivation domain of the volatile memory, wherein the deactivation domain includes the backup domain;
initiating the backup of the volatile memory domain to a non-volatile memory domain;
polling memory registers for completion of the backup;
determining if the backup was successful; and, if not successful:
notifying an operating system (OS) that the backup failed; and
completing the backup to an alternate media;
scrubbing the non-volatile memory; and, if uncorrectable errors are detected:
alerting the OS that a previously completed backup has failed;
selecting, via the OS the alternate media to backup the volatile memory domain;
backing up the volatile memory domain, via the OS, to the alternate media; and
changing a health status of the non-volatile memory.

7. The method of claim 6, comprising:
selecting, via the OS, the alternate media to backup the volatile memory domain; and
backing up the volatile memory domain, via the OS, to the alternate media.

8. The method of claim 6, comprising:
selecting, via a management controller, the alternate media to backup the volatile memory domain; and
backing up the volatile memory domain, via the management controller, to the alternate media.

9. A non-transitory, machine-readable storage medium encoded with instructions for partial backup during runtime, the instructions executable by a processor of a system to cause the system to:
initiate a backup of a volatile memory domain to a non-volatile memory domain, of a non-volatile memory;
poll memory registers for completion of the backup;
determine if the backup was successful; and, if not successful;
notify an operating system (OS), a management controller, or both that the backup failed; and
complete the backup to an alternate media,
scrub the non-volatile memory domain; and, if uncorrectable errors are detected:
alert the OS that a previously completed backup has failed;
select, via the OS, the alternate media to backup the volatile memory domain;
back up the volatile memory domain, via the OS, to the alternate media; change the health status of the non-volatile memory.

10. A method for handling errors during run-time back up of volatile memory, comprising:
determining that a backup should occur in a memory module having a volatile memory and a non-volatile memory;
determining a backup domain of the volatile memory, the backup domain being defined by a range of memory addresses within the volatile memory;
deactivating a deactivation domain of the volatile memory, wherein the deactivation domain includes the backup domain;
initiating the backup of the volatile memory domain to a non-volatile memory domain;
polling memory registers for completion of the backup;
determining if the backup was successful; and, if not successful:
notifying an operating system (OS) that the backup failed; and
completing the backup to an alternate media;
scrubbing the non-volatile memory; and, if uncorrectable errors are detected:
alerting a management controller that a previously completed backup has failed;
selecting, via the management controller, the alternate media to backup the volatile memory domain; and
backing up the volatile memory domain, via the management controller, to the alternate media.

11. The method of claim 10; comprising:
selecting, via the OS; the alternate media to backup the volatile memory domain; and
backing up the volatile memory domain, via the OS; to the alternate media.

12. The method of claim 10, comprising:
selecting, via a management controller, the alternate media to backup the volatile memory domain; and
backing up the volatile memory domain, via the management controller, to the alternate media.

* * * * *